May 2, 1961 W. F. KRAMER 2,982,110
AIR CONDITIONING
Filed Nov. 23, 1959

INVENTOR.
WILLIAM F. KRAMER
BY
Harry W. Hargis III
AGENT

United States Patent Office 2,982,110
Patented May 2, 1961

2,982,110

AIR CONDITIONING

William F. Kramer, Cheltenham, Pa., assignor to Philco Corporation, Philadelphia, Pa., a corporation of Pennsylvania Filed Nov. 23, 1959, Ser. No. 854,710

12 Claims. (Cl. 62—91)

The present invention relates to air conditioning, and is especially concerned with heat pump apparatus of a compact and unitary type, as well as with a novel mode of conditioning air while such apparatus is operating in its heating cycle.

It is well known in air conditioning practice that maintaining a conditioned space within the so-called "comfort zone" involves control of the air dry bulb temperature as well as limitation of the relative humidity prevailing within the space.

In air conditioning apparatus of the type commonly referred to as "single room coolers" it is possible to achieve both temperature and humidity control in accordance with summer comfort zone requirements. On the other hand, when operating apparatus of this type as a heat pump to heat an enclosure, the wet bulb temperature of the circulating heated air may drop below a desirable minimum winter comfort zone value, at which time it becomes necessary to restore the wet bulb temperature to a value in keeping with comfort zone requirements. While this problem has been recognized and dealt with in the art, solutions thereto have involved use of auxiliary means whose sole function is to introduce moisture into the enclosure being heated.

Broadly, the invention has for its primary objective provision of simple, automatic and effective means for controlling temperature-humidity conditions within a habitable enclosure.

It is a specific object of this invention to achieve, in the simplest possible manner, temperature and humidity control of the air within a habitable enclosure that is being heated.

It is still another specific object of the invention to provide means for usefully eliminating condensate formed at the outdoor coil or heat exchanger of heat pump apparatus.

In the achievement of the foregoing general ends, the invention contemplates both a method of and apparatus for heating and conditioning the air of an enclosure, featuring the collection of heat and moisture at the outdoor coil of a refrigeration type heat pump, heating the enclosure by circulating air from the enclosure in heat exchange relation with the indoor coil, selectively conducting condensate formed at the outdoor coil to the vicinity of the indoor coil during the heating cycle and in accordance with predetermined humidity conditions in the vicinity of the latter coil, and treating the circulating air being heated by entraining the condensate therein.

It is an important feature of the invention that entrainment of moisture in the circulating air is achieved by utilizing air moving and heat exchange elements of the refrigerating system alone.

The manner in which the foregoing objects and advantages may best be achieved will be understood from a consideration of the accompanying drawing forming a part of this disclosure, and in which.

Figure 1:
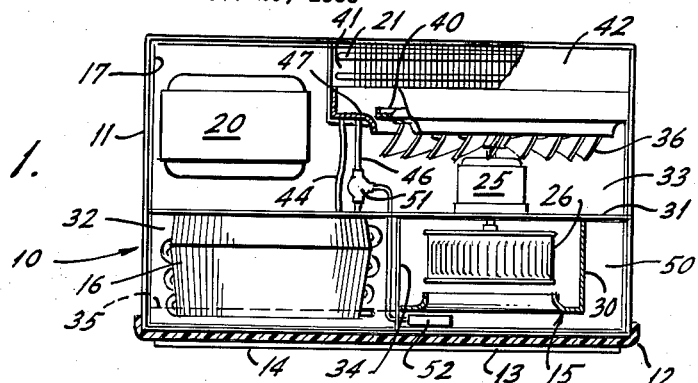
Figure 1 is a top plan view, with parts either removed or broken away, of air conditioning apparatus incorporating the concepts of the present invention.

While certain structural features are disclosed, but not claimed, as incidental to illustration of the present invention, such features are disclosed and claimed in the copending application of William H. Mullin et al., entitled "Air Conditioning," Serial No. 31,652, filed May 25, 1960, and assigned to the assignee of the present invention.

Now making more detailed reference to the drawing, and initially to Figures 1 to 3, the window mounted air conditioner 10 includes a cabinet 11 having a base portion 17 and a conventional decorative panel 12, the latter comprising inlet and outlet room air passage means for the air moving means 15 to be hereinafter more fully described. The inlet room air passage means includes grill 13 disposed in the right hand region of panel 12 and in air flow communication with air moving means 15. The aforementioned outlet air passage means includes grill 14 disposed in air flow communication with an evaporator coil 16, hereinafter also referred to as the indoor coil.

Figure 4:
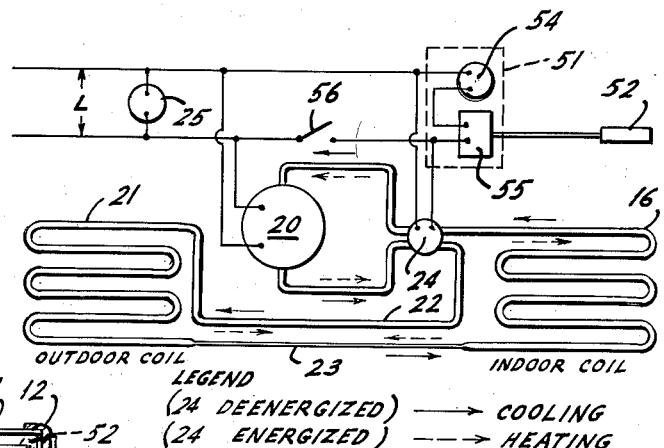
Figure 4 is a diagrammatic view illustrating the refrigerant circulating system and control apparatus employed therewith, together with the humidity control means of the present invention.

Evaporator coil 16 is part of a heat pump or reverse-cycle refrigerating system, as shown diagrammatically in Figure 4, including a motor-compressor 20, condensing or outdoor coil 21, and associated conduits through the agency of which said motor-compressor, condenser, and evaporator coil are coupled in series flow circuit. These circuits include a line 22 through which refrigerant normally is delivered to outdoor coil 21 as the condenser, and a feed line 23 which as shown, may advantageously comprise a continuously open restricted connection through which liquified refrigerant normally is fed to indoor coil 16 as the evaporator, for expansion therein. A reversing valve 24, of known design, is operative to provide for reversal of flow of the refrigerant when it is desired to heat an indoor space or enclosure with the air conditioner, whereby refrigerant is caused to flow in a direction opposite to the normal. Under reverse flow conditions outdoor coil 21 becomes the evaporator and indoor coil 16 becomes the condenser, reverse flow direction being indicated by the broken-line directional arrows applied to the refrigerating circuit shown in Figure 4. The arrows shown in full lines indicate the normal flow of refrigerant, as occurs during the refrigerating or room cooling cycle.

Referring again to air moving means 15, a motor 25 rotatably supports a blower 26 adapted to cause circulation of air in heat exchange relation with evaporator or indoor coil 16. Blower 26 is housed within a scroll structure 30 which is cooperable with a partition 31 to divide cabinet 11 into an evaporator coil chamber 32 and a condensing coil chamber 33 (Figures 1 and 3). The portion of cabinet 11 comprising chamber 32 is adapted to extend into a room or space to be air-conditioned, while chamber 33 of the cabinet lying to the other side of partition 31 extends outwardly of the room, preferably through a window opening thereof. Evaporator coil chamber 32 itself is partially sub-divided, by means of a partition 34, into a section housing the blower and scroll assembly and a section within which is disposed evaporator coil 16. The mouth portion 35 of scroll 30 extends through partition 34 and into position to direct air against one face of evaporator coil 16 (Figures 2 and 3).

Condensing coil chamber 33 also has disposed therein motor-compressor 20 and motor 25. A propeller-type fan 36 also is rotatably supported within chamber 33 by motor 25 to provide for drawing outside air into the chamber over the outdoor coil and discharging the spent air outwardly from the chamber over motor-compressor 20.

Figure 3:
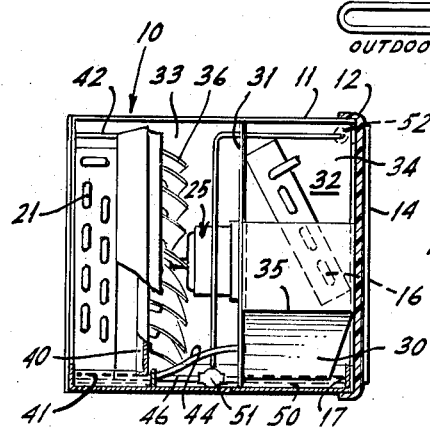
Figure 3 is an end view, with parts either removed or in section, of the left hand portion of Figure 2.

Fan 36 includes a conventional condensate slinger ring 40 which dips into a condensate sump 41 (Figures 1 and 3). In accordance with known practice, rotation of the fan causes condensate in sump 41 to be flung by ring 40 onto baffle means 42 suitably disposed above the ring and extending, in a downward direction, over outdoor coil 21. Condensate impinging upon baffle means 42 flows along the latter and drips onto outdoor coil 21, to be evaporated therefrom during the room cooling or refrigerating cycle.

Conduit means for directing the flow of condensate formed at the indoor coil to sump 41 comprises an opening 43 (Figure 2) in room air blower scroll 30, from which opening there extends a tube 44 (see also Figures 1 and 3) terminating at sump 41. Extending across the bottom wall portion of scroll mouth 35 is trough means 45 disposed and adapted to prevent condensate that drips from indoor coil 16 during a cooling cycle from running into the lowermost portion of scroll 30 and to insure outflow of condensate through opening 43 for subsequent disposal in the manner above described.

In particular accordance with the invention, a tube 46 connects an opening 47 in sump 41 with an opening 48 in the sump-like region 50 below the blower scroll 30. Tube 46 and openings 47 and 48 associated therewith are so positioned that moisture collected in sump 41 and rising above a predetermined level will tend to flow through the tube into region 50. Flow of water through tube 46 is controlled by normally-closed valve means 51 disposed therein and controlled by a humidity-responsive sensing element 52 disposed in evaporator coil chamber 32, in the region of the blower and scroll assembly. Valve means 51 (Figure 4) includes an electrically energizable coil 54, actuatable in response to the opening and closing of a switch 55 operated by sensing element 52. As seen also in Figure 4, energy is supplied to means 51 by a voltage source L having in series therewith a selectively actuatable switch 56. In the heat pump apparatus shown, reversing valve 24 is of the electrically operated type and is actuatable to reverse the flow of refrigerant in response to closing switch 56. Note that valve 51 can only be opened when switch 56 is closed for the heating cycle.

Additional elements energized by source L are the motor-compressor 20 and fan motor 25. While no control means are shown for modulating either the heating or cooling cycles of the apparatus, it will be understood that such control means is well known in the art and detailed description thereof need not be made in connection with the present invention.

According to the invention, and with reference particularly to Figure 4, switch 56 is closed to effect reverse-cycle heating, and moisture condensed upon the surfaces of the relatively cold outdoor coil 21 is collected in sump 41. In the event the relative humidity of the air being heated by indoor coil 16 falls below a predetermined value, sensing element 52 actuates switch 55 to open valve 51, and condensate flows from sump 41 to the collection region 50 beneath the blower scroll. A slotted aperture 53 is provided in the lower portion of scroll 30 at such a location that water will accumulate in region 50 to the level of the scroll aperture 53.

Figure 2:
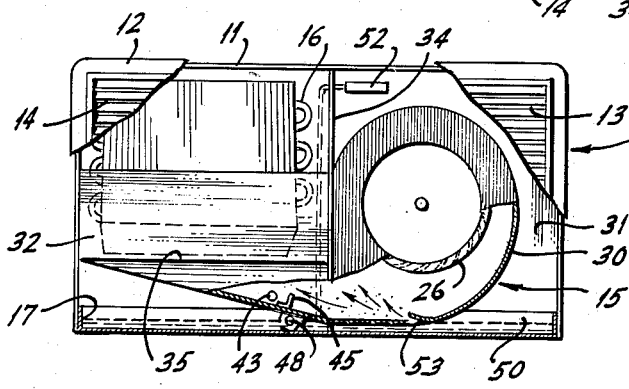
Figure 2 is a front elevational showing, partly in section and with parts broken away, of apparatus seen in Figure 1.

As indicated by arrows in Figure 2, minute droplets of this water are drawn upwardly through aperture 53 and entrained as moisture substantially uniformly throughout the cross-section of the air stream directed toward indoor coil 16, the entrained moisture being forced outwardly through scroll mouth 35 and impinging upon the relatively warm indoor coil. The heat of coil 16 is effective to evaporate the moisture in contact therewith, whereupon the vapor and any remaining moisture flows with the air into the room being conditioned. This entrainment of moisture continues so long as the level of condensate in sump region 50 is maintained at or above the level of aperture 53.

When the desired relative humidity within the room is attained, sensing element 52 will cause valve 54 to be closed, following which closure no further condensate will be supplied to the sump region 50. Consequently, the condensate in region 50 will be depleted to a level below that of aperture 53, at which time no further entrainment of moisture will take place. Overflow of condensate from sump 41 will of course be retarded due to the action of slinger ring 40 which will effect entrainment of some of this condensate as moisture in the circulating outdoor air. It will be understood, of course, that suitable condensate drain means may be provided to ensure against overflow thereof. Such drain means should be so arranged as to maintain the condensate at a level ensuring the supply thereof to the scroll 30, through aperture 53, in the achievement of humidification of air being heated.

From the foregoing description it is seen that the invention provides for controlled humidification of air heated by heat pump apparatus by utilizing air moving and heat exchange elements of the apparatus itself in novel cooperative arrangement with means for sensing humidity conditions in the air being treated.

I claim:

1. A method of conditioning the air of an enclosure, utilizing a refrigeration type heat pump having indoor and outdoor heat exchangers, comprising: collecting heat and moisture at the outdoor heat exchanger; heating the enclosure by circulating air from the enclosure in heat exchange relation with the indoor heat exchanger; sensing the relative humidity of the circulating air; selectively conducting moisture collected at the outdoor heat exchanger to the vicinity of the indoor heat exchanger in accordance with predetermined sensed relative humidity conditions of the circulating air; and entraining said moisture in the circulating heated air.

2. In refrigeration type heat pump apparatus comprising an indoor heat exchanger and an outdoor heat exchanger, means for conducting condensate formed at the outdoor heat exchanger to the vicinity of the indoor heat exchanger, means for circulating air over the indoor heat exchanger, means responsive to the relative humidity of the circulating air for controlling the flow of condensate to the vicinity of the indoor heat exchanger, and means for entraining said condensate in the circulating air.

3. Apparatus in accordance with claim 2 wherein the entrained condensate is caused by the circulating air to be impinged upon said indoor heat exchanger for evaporation therefrom.

4. A method of air conditioning a space comprising the steps of absorbing heat and condensing moisture from air outside said space, conducting said heat to a location within said space, moving air within said space through such location to absorb heat therein, sensing the relative humidity of the moving air, selectively conducting said moisture into the path of said air as it moves through the aforesaid location in accordance with predetermined sensed values of relative humidity, and entraining said moisture in the moving air.

5. Apparatus for air conditioning a space, comprising: a first heat exchanger disposed exteriorly of said space and adapted to absorb heat and condense moisture from air caused to flow in heat exchange therewith; a second heat exchanger disposed within said space and adapted to give up heat to air of said space; air moving means for effecting flow of air from said space in heat exchange relation with said second heat exchanger; means for conducting heat between said first and second heat exchangers; means for conducting moisture from the region of said first heat exchanger and into the path of the space air being caused to flow, for entrainment of the moisture therein; and humidity responsive means disposed in said space and associated with said last recited means to control the flow of moisture therethrough.

6. In a heat pump of the type including a reversible refrigerant circuit having an indoor heat exchanger, an outdoor heat exchanger, and means for controlling the flow of refrigerant between said heat exchangers in either direction whereby, under one condition, the indoor heat exchanger functions as the evaporator and, under the other condition, the outdoor heat exchanger functions as the evaporator, disposal means for condensate formed at either of said heat exchangers, comprising: condensate collecting trough means disposed below said indoor heat exchanger; first condensate collecting sump means disposed in the region of said outdoor heat exchanger, said sump means being at a level below the level of said collecting trough means; conduit means connecting said trough means with said sump means and providing for flow of condensate from said trough means to said sump means; means for moving air over said outdoor heat exchanger and effecting flow of said condensate over the surfaces of said outdoor heat exchanger to vaporize the condensate; means for moving air in heat exchange relation with said indoor heat exchanger; second sump means disposed in the region of said last mentioned air moving means, said second sump means being disposed substantially at the same level as said first sump means; second conduit means interconnecting said first sump means and said second sump means and providing for flow of condensate from said first sump means to said second sump means; valve means disposed in said second conduit means and adapted to control the flow of condensate between said first and second sump means, said valve means being operable by means responsive to the relative humidity of air being moved over said indoor heat exchanger when the latter is functioning as the condenser; and means for entraining condensate disposed within said second sump means in the circulating air, when said indoor heat exchanger is functioning as the condenser.

7. Apparatus for air conditioning a space, comprising: a first heat exchanger disposed exteriorly of said space and adapted to absorb heat and condense moisture from air caused to flow in heat exchange therewith; a second heat exchanger disposed within said space and adapted to give up heat to air of said space; air moving means for effecting flow of air from said space in heat exchange relation with said second heat exchanger; means for conducting heat between said first and second heat exchangers; and means for conducting moisture from the region of said first heat exchanger and into the path of the space air being caused to flow, for entrainment of the moisture therein.

8. Apparatus for conditioning the air within a space, comprising: first heat exchange means disposed in air flow communication with air disposed outside said space and adapted to absorb heat and condense moisture from outside air caused to flow in heat exchange relation therewith; second heat exchange means disposed in air flow communication with said space and adapted to give up heat to air of said space; air moving means for effecting flow of air within said space in heat exchange relation with said second heat exchange means; means for conducting heat between said first and second heat exchange means; and valve controlled conduit means for conducting condensed moisture from the region of said first heat exchange means into the path of the space air being caused to flow, for entrainment of the moisture therein.

9. Apparatus in accordance with claim 8 and further including means operative in response to humidity conditions within said space air to control the flow of condensed moisture through said conduit means.

10. In heat pump apparatus of the type including a reversible refrigerant circuit having an indoor heat exchanger, an outdoor heat exchanger, and means operative selectively to control the flow of refrigerant between said heat exchangers in either direction whereby, under one condition of operation, the indoor heat exchanger functions as the evaporator and, under another condition of operation, the outdoor heat exchanger functions as the evaporator, condensate handling means, comprising: means disposed and adapted to collect condensate formed at either heat exchanger; and means selectively operable, in accordance with the selected condition of operation, to deliver the condensate formed at either heat exchanger to the other thereof.

11. In heat pump apparatus of the type including a reversible refrigerant circuit having an indoor heat exchanger, an outdoor heat exchanger, and means operative selectively to control the flow of refrigerant between said heat exchangers in either direction whereby, under one condition of operation, the indoor heat exchanger functions as the evaporator and, under another condition of operation, the outdoor heat exchanger functions as the evaporator, condensate handling means, comprising: sump means disposed and adapted to collect condensate formed at either the outdoor or the indoor heat exchanger; and means selectively operable, in accordance with the selected condition of operation, to deliver the condensate formed at one heat exchanger to the other heat exchanger.

12. Heat pump apparatus in accordance with claim 11 and including means operative to control the delivery of condensate to said indoor heat exchanger in response to humidity conditions prevailing in the vicinity of the latter heat exchanger.

References Cited in the file of this patent

UNITED STATES PATENTS

| | | |
|---|---|---|
| 2,316,704 | Moore | Apr. 13, 1943 |
| 2,811,023 | Lathrop | Oct. 29, 1957 |
| 2,911,797 | Stocking | Nov. 10, 1959 |